Dec. 3, 1935.                    D. VON MIHÁLY                  2,023,348
                          APPARATUS FOR OPTICAL PRINTING
                              Filed Nov. 23, 1933
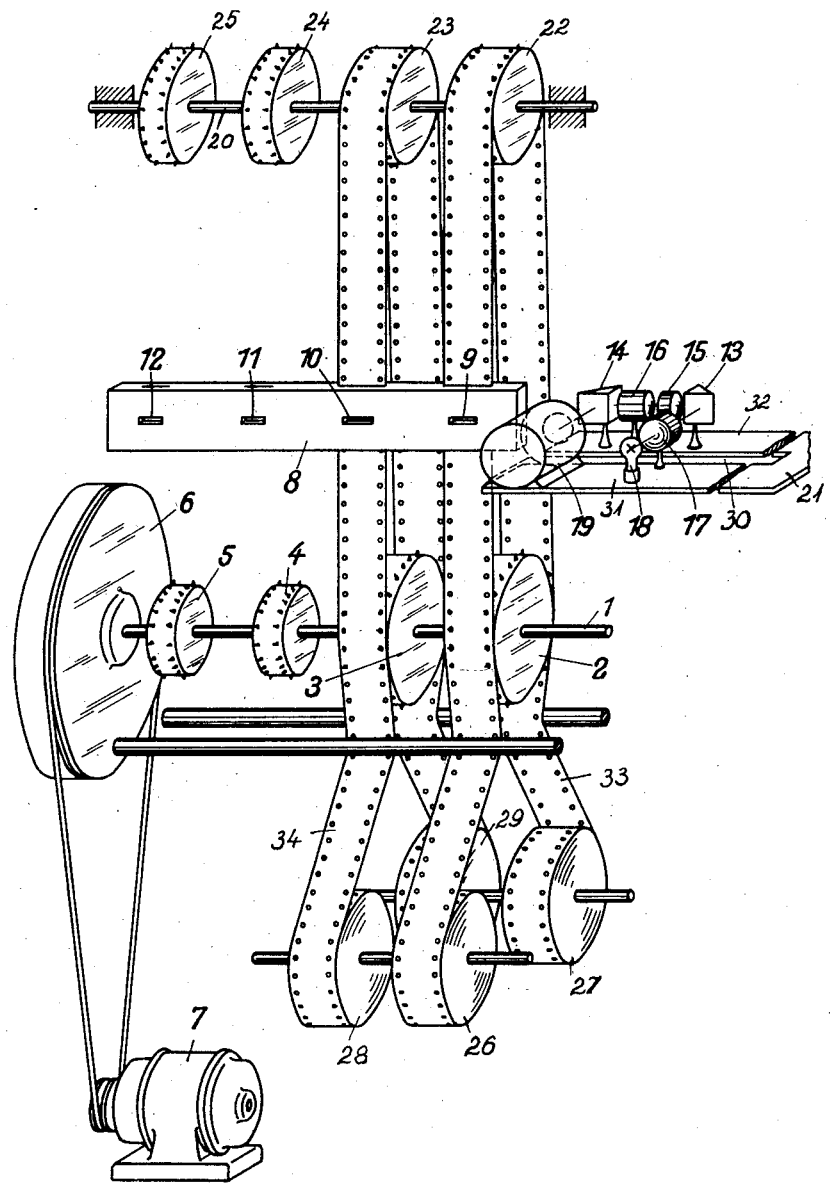
Inventor:
Dénes von Mihály
Attorneys:
Bailey & Larson Patented Dec. 3, 1935

2,023,348

UNITED STATES PATENT OFFICE 2,023,348

APPARATUS FOR OPTICAL PRINTING

Dénes von Mihály, Berlin-Wilmersdorf, Germany

Application November 23, 1933, Serial No. 699,470
In Germany December 8, 1931

10 Claims. (Cl. 88—24)

My invention relates to an apparatus for printing upon a positive film the image from a negative film, more particularly for printing sound films.

In printing sound films there is a great difficulty arising from the fact that, considering the extremely little dimensions of the single parts of the sound record, already the least irregularities in the movement of the films cause defects in the sound track of the positive film which strongly injure the quality of the sound reproduction. Although this difficulty is great enough with printing from a negative film of normal size upon a positive film of the same size, it even increases with printing from a negative film of normal size upon a positive film of smaller size, as being used in home projectors, since here the dimensions of the single parts of the sound track are even considerably smaller than with normal films. The well known contact film printers are not to be used for this purpose, owing to the longitudinal oscillation of the films in such printers. Neither can the known optical printers be used satisfactorily, because here the films are driven by separate driving mechanism, or by a common driving mechanism acting upon the film by means of separate gears, and oscillations between the single parts of the driving mechanism can not be avoided.

It has also been proposed to drive the negative and the positive film by sprocket-wheels being mounted upon a common shaft, the printing light ray being led from the negative to the positive film by optical means including mirrors or prisms for turning the light ray at right angles. Although here the sprocket-wheels are moving in exact synchronism, the films themselves are not, because they are moved at the printing spot in opposite directions so that for feeding one of the films to the take-up reel and for withdrawing the other one from the take-off reel another pair of sprocket-wheels is necessary, which latter pair is driven independently from the first said pair. However as soon as the film is subject to the action of two sprocket-wheels, oscillations must necessarily occur and defects in the sound track of the positive film can not be avoided.

According to my invention the above mentioned drawback is avoided by driving each film by a single sprocket-wheel, these sprocket wheels being mounted on a common shaft. The films are withdrawn from the respective take-off reels by the one side of said sprockets and they are fed to the respective take-up reel by the other side of the same sprockets, so that no more driven sprockets are acting upon the films on their way from the take-off reel past the printing spot to the take-up reel. Thus any possibility of a difference between the speed of the two films or of oscillations within the film length between the two reels is eliminated so that even with printing from a normal negative film to a narrow positive film the sound track on the latter will be a true and faultless reduced copy of the sound track on the negative film. It is to be understood, however, that my invention can as well be used in printing from a negative of normal size to a positive of the same size, because also in this case the quality of the copy of the sound track on the positive film will be much better than with any known printing method.

The accompanying drawing shows one embodiment of my invention in diagrammatic form with many details which are old and common in the art omitted for the purpose of clearness.

Referring to the drawing, a single shaft 1 is shown supporting the four sprockets 2, 3, 4 and 5, the sprockets 2 and 3 being of a size adapted for threading normal films, and the sprockets 4 and 5 being of a smaller size adapted for threading narrow films. All these sprockets are rotatable with the shaft, and the latter is driven by a motor 7 by means of a belt pulley 6 serving at the same time as a fly wheel. Above the shaft 1 there is another shaft 20 supporting also four sprockets 22, 23, 24 and 25, the sprockets 22 and 23 being of the same size as 2 and 3, and the sprockets 24 and 25 being of the same size as 4 and 5.

In case that the images of a normal size negative film are to be printed upon a normal size positive film, the negative film is withdrawn from the take-off reel 26 by the front side of the sprocket 2, then it is threaded in a loop over the sprocket 22 to the rear side of the sprocket 2 whereby it is fed to the take-up reel 27. The positive film is led correspondingly from the take-off reel 28 past the front side of sprocket 3 to sprocket 23 and then past the rear side of sprocket 3 to the take-up reel 29. The reels 27 and 29 may be driven from any suitable source of power (not shown).

Between the shafts 1 and 20 there is arranged a mask 8 provided with suitable guides for the films, and with slits 9, 10, 11 and 12, these slits being arranged so that the films must pass them on their way from the sprocket of the shaft 1 to the respective sprockets of the shaft 20.

A carrier plate 21 can be shifted sideways along the mask 8. This carrier plate is provided with a slit 30 allowing the films to pass through it. The carrier plate supports on its one arm 31 a suitable source of light 18, a condenser 17 and an objective 19; its other arm 32 supports a prism 13, a reducing lens 15, a reversion lens 16 and another prism 14. The distance between the source of light 18 and the objective 19 as well as between the prisms 13 and 14 is such that if the carrier plate is shifted to the left as far that the light 18 stands before the slit 9, and the prism 13 behind the same slit, then the objective 19 is situated before the slit 10, and the prism 14 behind this slit. The lens 16 serves only for reducing the size of the images if the positive film occurs to be a narrow film and therefore it can be omitted for the present.

In order to print the images of the negative film 33 upon the positive film 34 the carrier plate 21 is shifted to the left as far that the source of light 18 and its condenser 17 stand before the slit 9. Then the images of the film 33 which are illuminated by the lamp 18 through the condenser 17, will pass through the slit 9 to the prism 13 where they are projected at right angles through the lens 15 to the second prism 14, where they are again turned at right angles and through the slit 10 directed to the positive film 34. Since both films 33 and 34 are moving in the same direction, the reversed images will be printed in the right manner on the positive film. The objective 19 enables to observe the image during the printing operation, and to regulate the light intensity according to the density of the negative film.

In case that the images of a normal size negative film are to be printed upon a small size positive film, then the negative film will be threaded over the sprockets 3, 23 and the positive film over sprockets 4, 24 and the carrier plate is brought in suitable relation to the slits 10 and 11.

Of course it is not necessary to provide four sprockets but the number, size and arrangement of the sprockets may be chosen according to the necessities of each user. It is only important that, if there are sprockets of different size, their diameter and number of teeth must be such that the big sprockets as well as the small ones should forward the films of different size with the same relative speed, i. e. that the number of images passing through the mask 8 within a certain time should be equal with both films.

What I claim is:

1. An optical printer comprising a single rotatable shaft driven by any suitable source of power, a plurality of sprockets on said shaft provided with teeth to engage the perforation of the positive and the negative film, means for guiding said films from the teeth on one side of said sprockets in a loop to the teeth on the other side of said sprockets, and optical means located adjacent the path of the portion of the film forming such loop and including light deflecting means located between the loops for projecting the images of said negative film to said positive film.

2. An optical printer according to claim 1, wherein the rotatable shaft supports two sprockets of equal size.

3. An optical printer according to claim 1, wherein the rotatable shaft supports sprockets of different size, the ratio of the diameters of said sprockets being equal to the ratio of the usual speeds of the films of different size.

4. An optical printer according to claim 1, wherein the rotatable shaft supports two sprockets adapted for threading normal films and two other sprockets adapted for threading narrow films, the distances between any adjacent sprockets being equal to one another.

5. An optical printer according to claim 1 comprising another rotatable but not driven shaft supporting sprockets of the same size, number and relative position as the first said rotatable shaft for guiding the films in a loop.

6. An optical printer comprising a single rotatable shaft driven by any source of power, a plurality of sprockets on said shaft, another rotatable undriven shaft supporting sprockets of the same size, number and relative position as the first said shaft, and optical means for projecting the images of the negative film threaded over one pair of said sprockets to the positive film threaded over another pair of said sprockets, and means for guiding said films from the teeth on one side of the sprockets supported by said driven shaft over the corresponding sprockets supported by said not driven shaft to the teeth on the other side of the sprockets supported by said driven shaft, said optical means being arranged on the path of the films between the sprockets supported by the driven shaft and the sprockets supported by the undriven shaft.

7. An optical printer according to claim 1 comprising a mask arranged on the path of the films in said loop, said mask being provided with a number of film guides arranged correspondingly to said sprockets, and exposure slits provided in the mask at each guide.

8. An optical printer according to claim 1, wherein the said optical means are arranged on a carrier plate being provided with a slot and adapted to be shifted sideways.

9. An optical printer according to claim 1, wherein the said optical means comprise an objective for observing the images being projected to the positive film, through said positive film.

10. An optical printer according to claim 1, wherein the said optical means comprise a reducing lens for reduced projection of the images of said negative film to said positive film.

DÉNES VON MIHÁLY.